United States Patent [19]

Ravier et al.

[11] Patent Number: 5,331,521
[45] Date of Patent: Jul. 19, 1994

[54] MOTOR VEHICLE HEADLAMP FITTED WITH IMPROVED FIXING MEANS

[75] Inventors: Jean-Paul Ravier, St Maur Les Fosses; Antoine Deslandres, Boissy-St-Leger; Ghislaine Pinson, Villeneuve La Garenne, all of France

[73] Assignee: Valeo Vision, Bobigny, France

[21] Appl. No.: 987,631

[22] Filed: Dec. 9, 1992

[30] Foreign Application Priority Data

Dec. 13, 1991 [FR] France .................. 91 15506

[51] Int. Cl.⁵ .............................. B60Q 1/00
[52] U.S. Cl. ...................... 362/80; 362/310
[58] Field of Search ............ 362/80, 83, 310, 329

[56] References Cited

U.S. PATENT DOCUMENTS

| | | | |
|---|---|---|---|
| 2,094,089 | 9/1937 | Baker | 362/83 |
| 2,138,082 | 11/1938 | Worden | 362/83 |
| 2,744,999 | 5/1956 | Arnejo | 362/83 |
| 3,267,278 | 8/1966 | Doolittle | 362/80 |
| 3,414,762 | 12/1968 | Wyzykowski | 362/80 |
| 4,345,303 | 8/1982 | Gerard et al. | 362/80 |
| 4,471,413 | 9/1984 | Dick | 362/83 |
| 4,480,291 | 10/1984 | Dranginis | 362/83 |
| 4,654,761 | 3/1987 | Walsh | 362/329 |
| 4,675,792 | 6/1987 | Dorleans | 362/83 |
| 4,831,502 | 5/1989 | Fujino et al. | 362/310 |
| 4,862,337 | 8/1989 | Ohshio et al. | 362/310 |
| 5,072,340 | 12/1991 | Jones | 362/83 |
| 5,138,542 | 8/1992 | Daumueller et al. | 362/80 |
| 5,188,444 | 2/1993 | Makita et al. | 362/80 |

FOREIGN PATENT DOCUMENTS

| | | | |
|---|---|---|---|
| 0178407 | 8/1985 | European Pat. Off. . | |
| 0243241 | 10/1987 | European Pat. Off. | 362/80 |
| 0720509 | 7/1942 | Fed. Rep. of Germany . | |
| 1049252 | 1/1959 | Fed. Rep. of Germany . | |
| 2732895 | 1/1979 | Fed. Rep. of Germany . | |
| 3123053 | 1/1983 | Fed. Rep. of Germany . | |
| 2494812 | 5/1982 | France . | |
| 2657148 | 7/1991 | France . | |

Primary Examiner—Louis J. Casaregola
Assistant Examiner—Michael I. Kocharov

[57] ABSTRACT

A motor vehicle headlamp of the type comprising a lamp, a reflector in which the lamp is mounted, and a glass suitable for being received in an opening in the bodywork of the vehicle, the headlamp being wherein the glass is fixed to the bodywork in the region of said bodywork adjacent to the opening. This serves to eliminate defects in mutual positioning between the glass and the bodywork due to manufacturing tolerances.

9 Claims, 5 Drawing Sheets

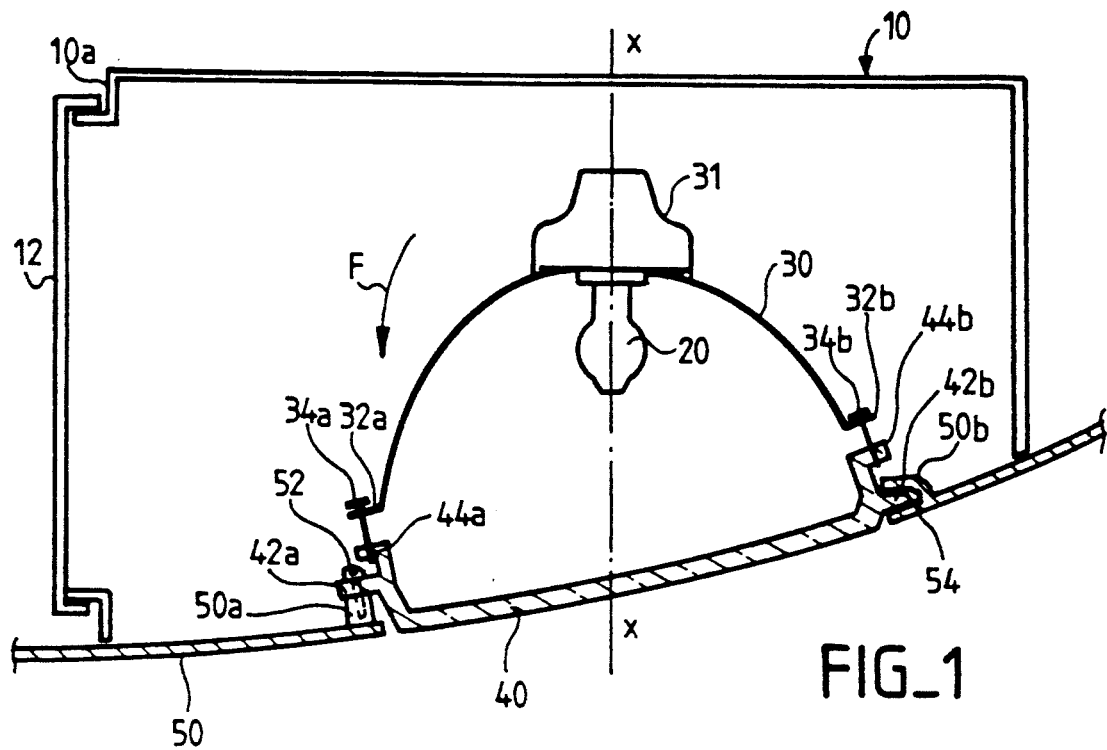
FIG_1
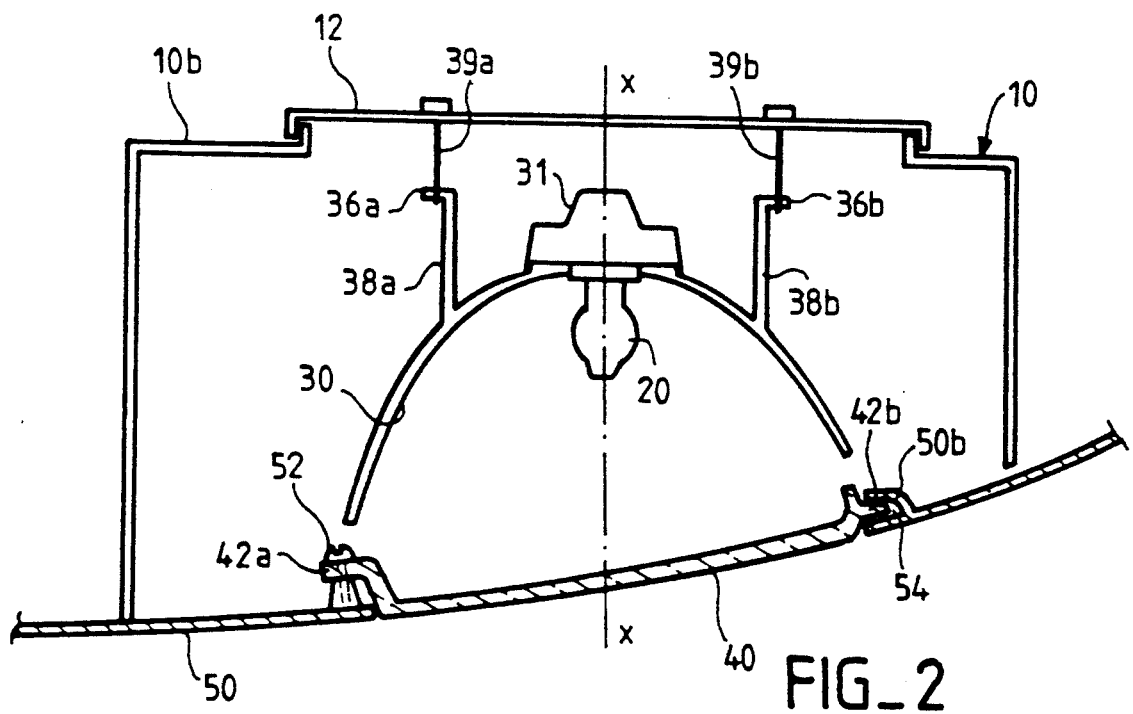
FIG_2

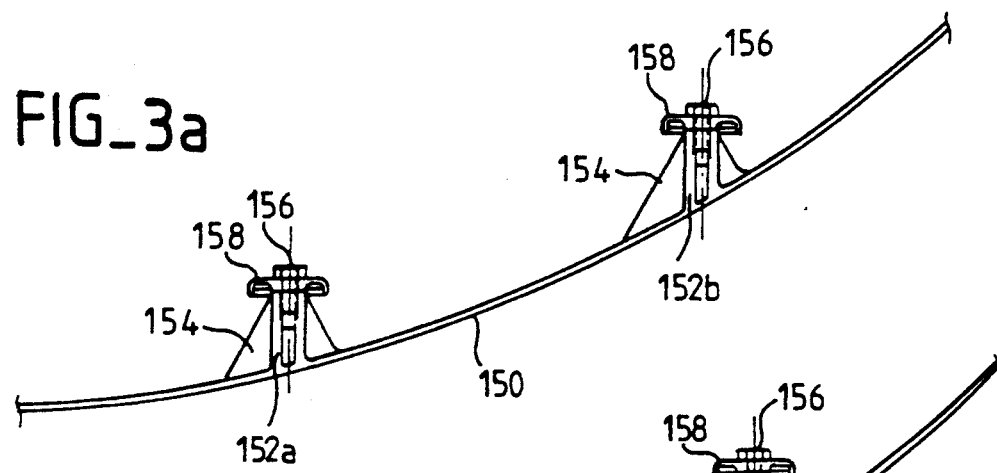
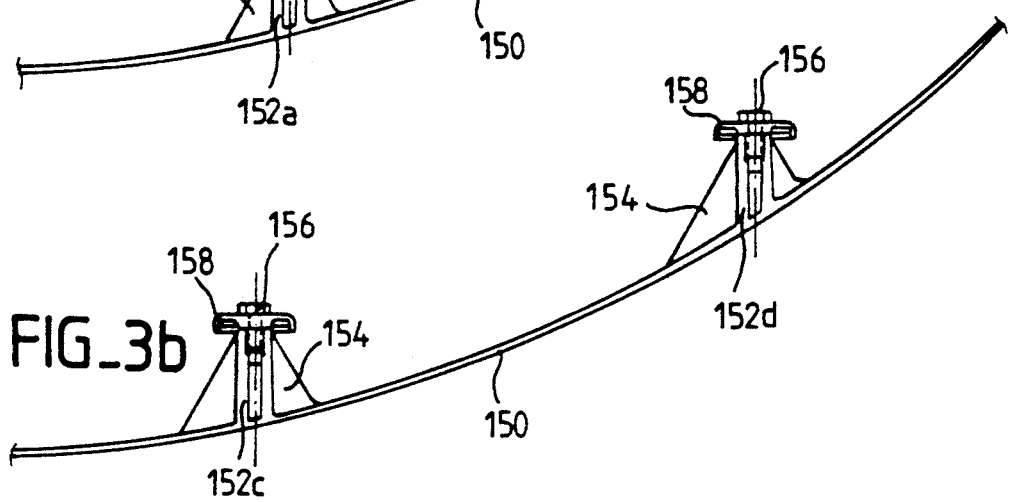
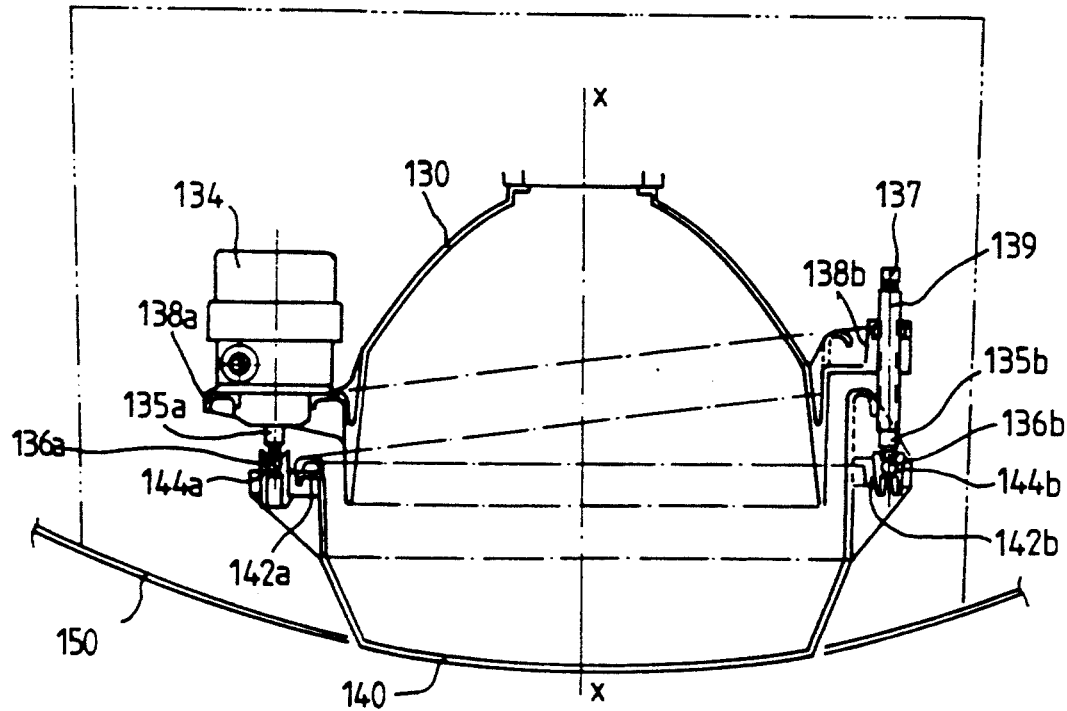

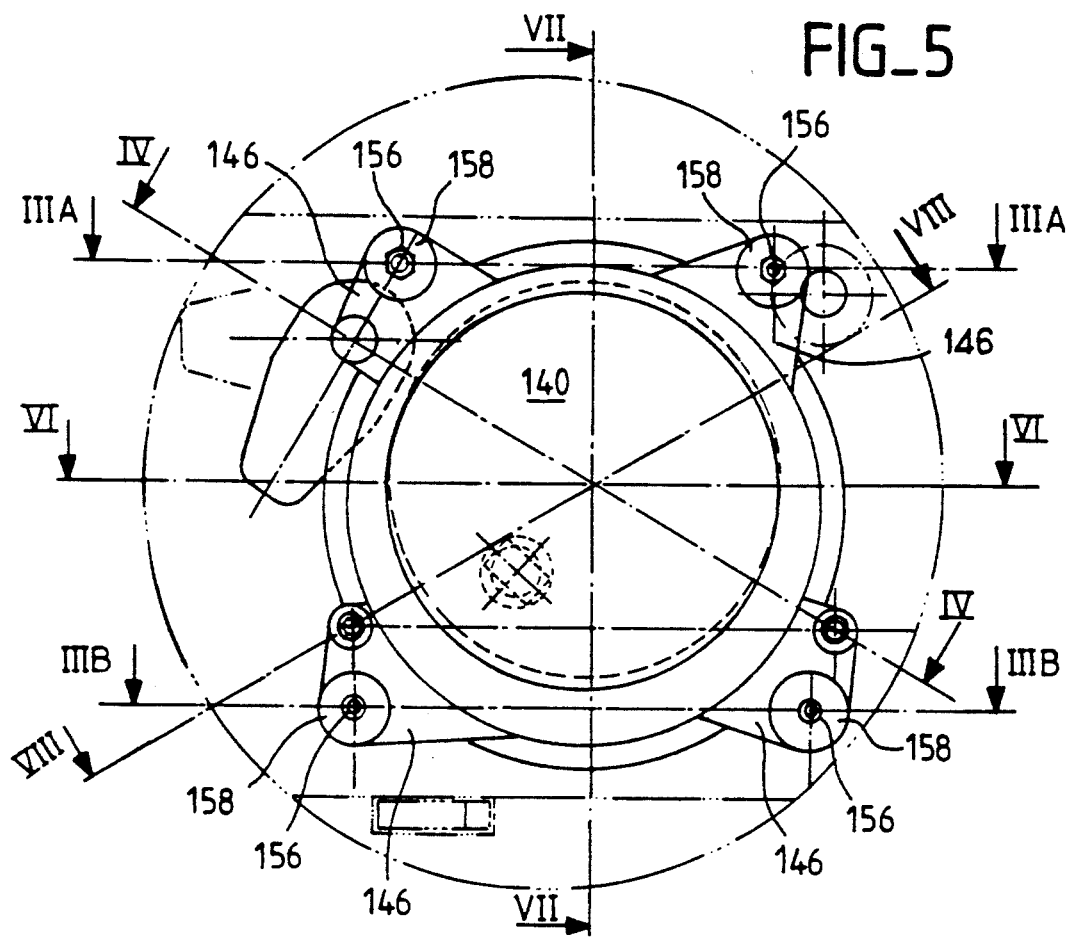
FIG_5
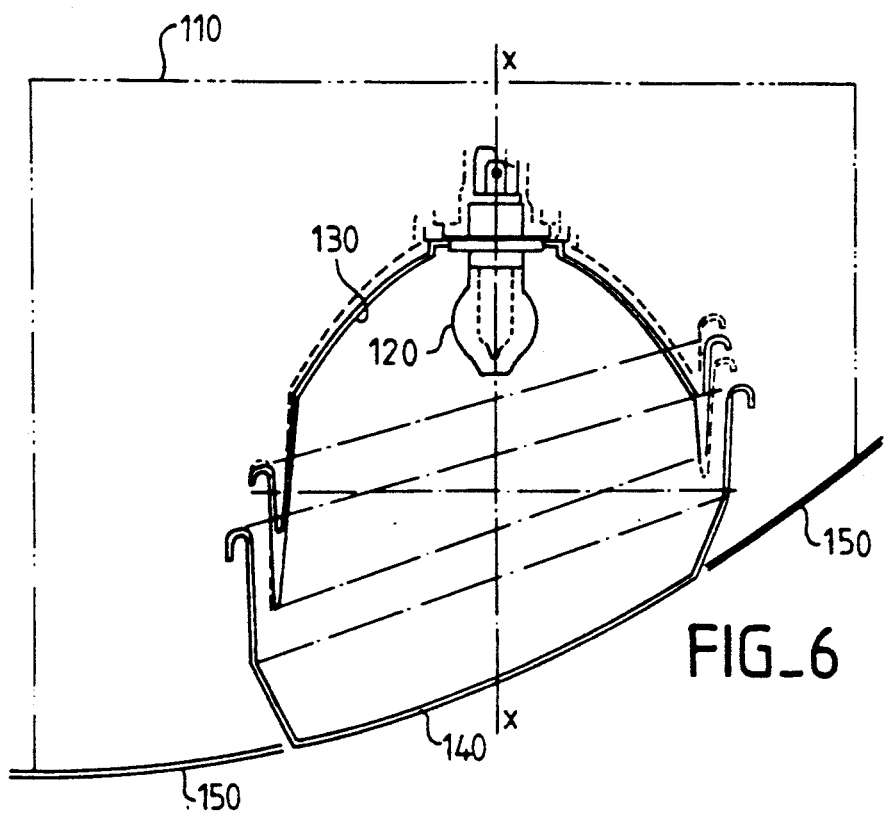
FIG_6

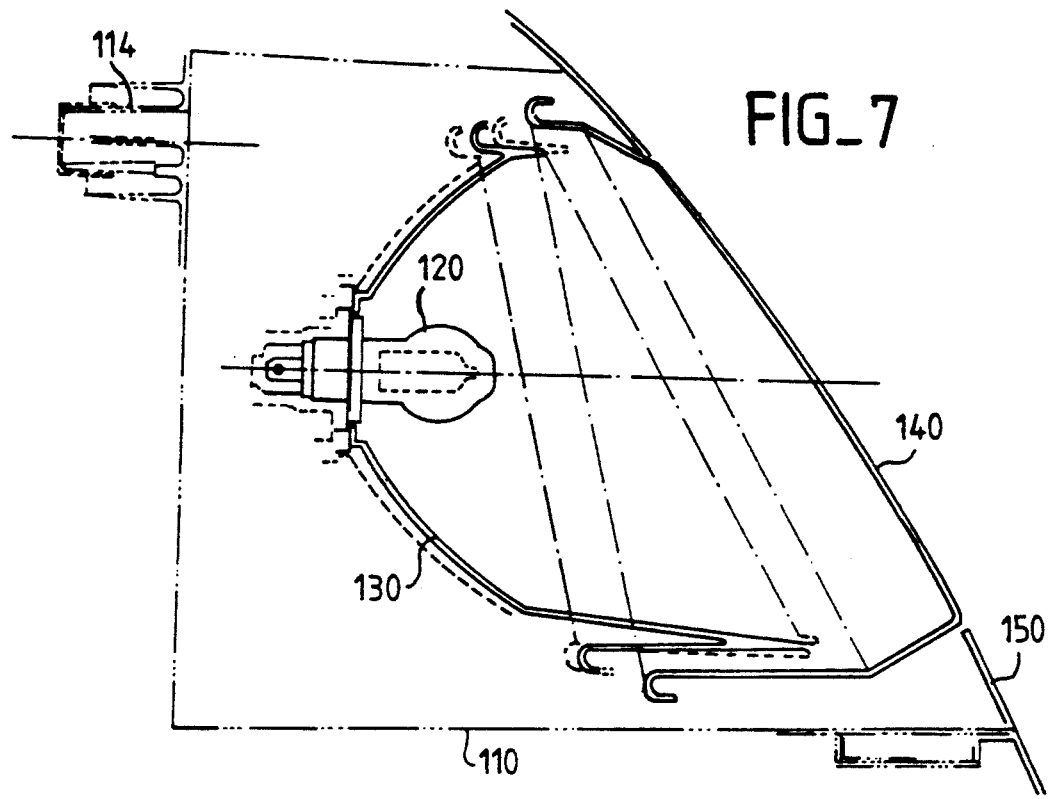
FIG_7
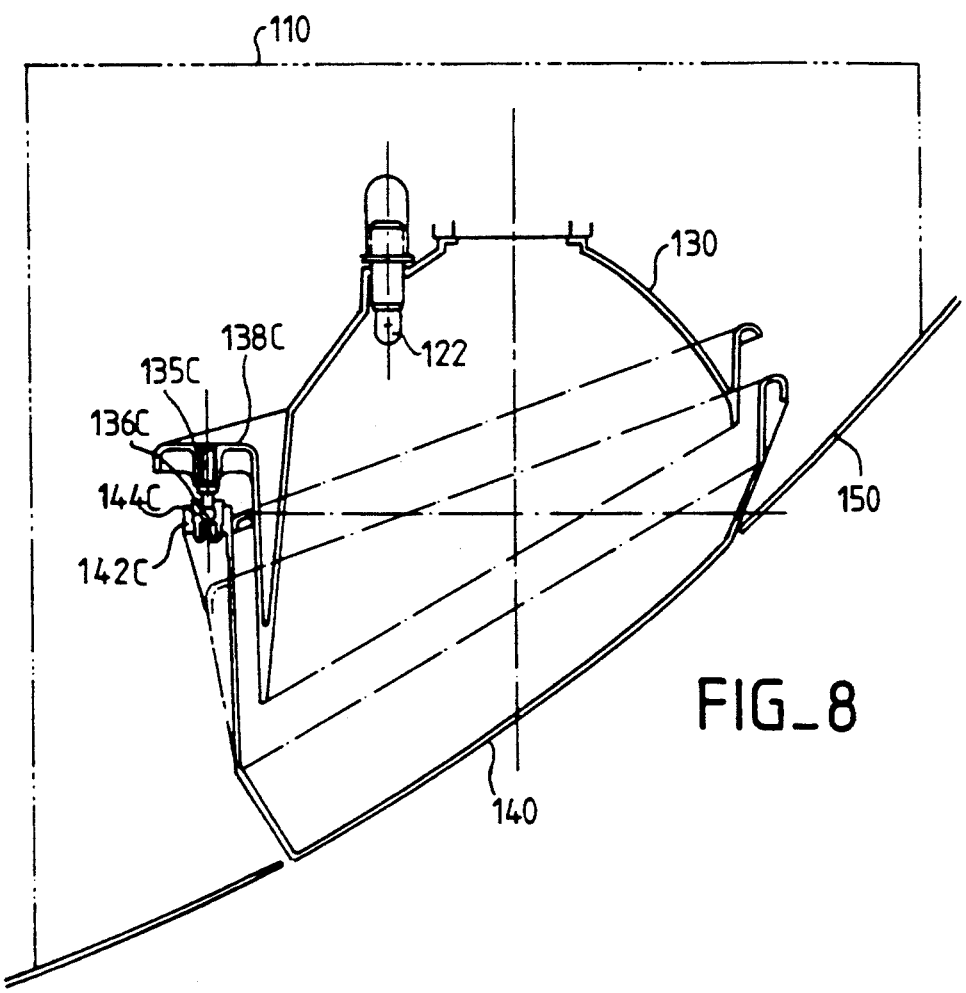
FIG_8

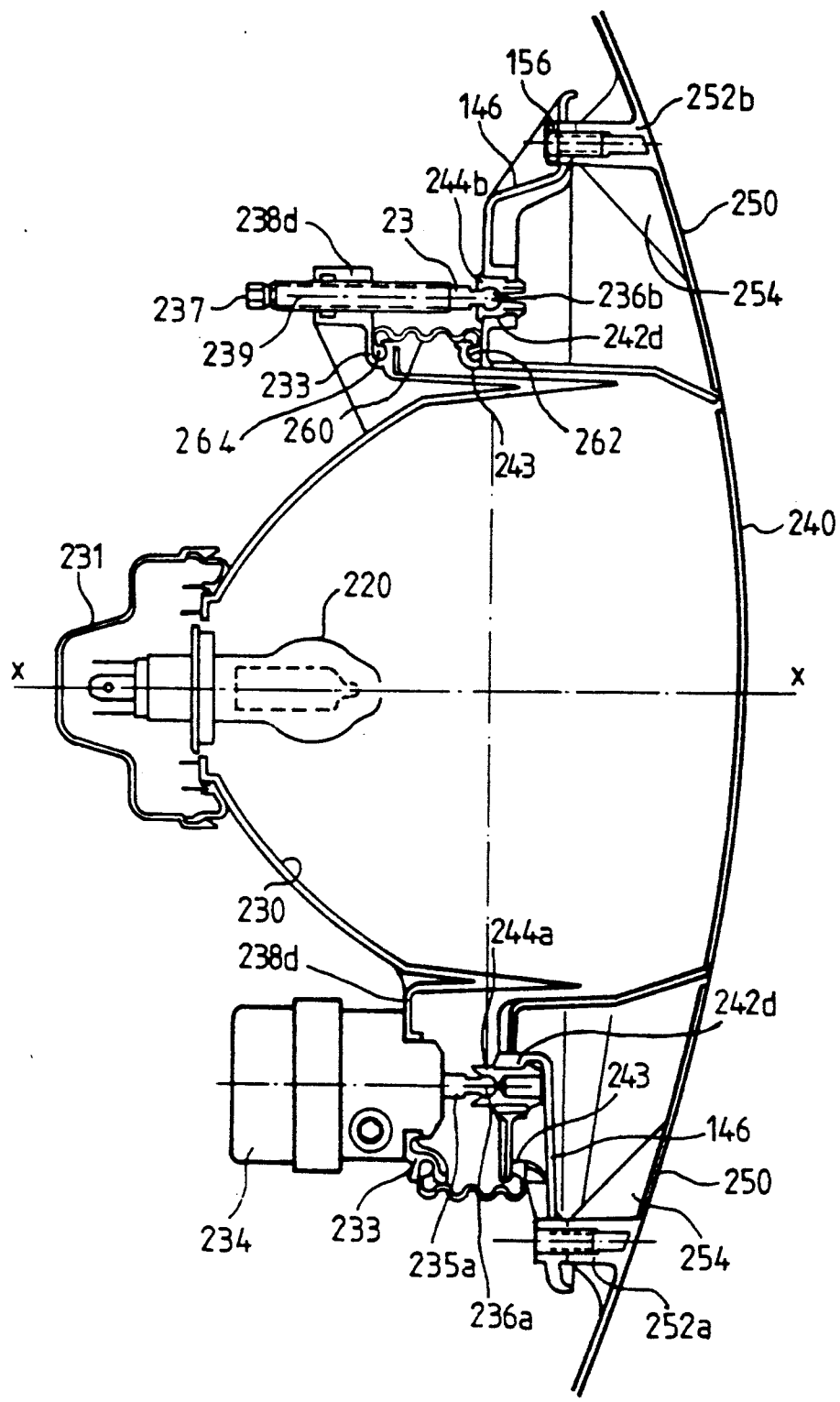
FIG_9

MOTOR VEHICLE HEADLAMP FITTED WITH IMPROVED FIXING MEANS

The invention relates in general to motor vehicle headlamps.

BACKGROUND OF THE INVENTION

Conventionally, a headlamp comprises a box, a glass closing a front opening of the box, and a reflector and a lamp mounted in the box.

The box is rigidly fixed to the body of the vehicle so that the glass occupies an opening in the bodywork provided therefor, but without being fixed to said bodywork.

There exist certain headlamps that do not have a separate box, the reflector and the glass defining an enclosure and the headlamp being fixed to the vehicle by suitable arrangements provided behind the reflector or on one side of it.

At present, for reasons of style and of streamlining, it is desired that the glass should be centered as accurately as possible in the opening of the bodywork and also that the outside face of the glass should be as flush as possible with the bodywork.

In practice, these objectives turn out to be difficult to achieve using conventional headlamps of the above-specified type, given the manufacturing tolerances of the various parts involved. More precisely, errors in the dimensions of the glass, the box or the reflector on which the glass is fixed, the body, and the bodywork can accumulate so as to come to values that are quite excessive, of the order of several millimeters, which in practice leads to the glass being badly positioned in its opening.

A known solution for mitigating this difficulty consists in providing adjustable assembly means between the headlamp box and the vehicle body. Nevertheless, such a solution undesirably increases the cost of the headlamp and makes installation thereof lengthy and fiddley.

The present invention seeks to mitigate these drawbacks of the prior art and to propose a headlamp in which it is certain that excellent mutual positioning is obtained between the headlamp glass and the adjacent bodywork of the vehicle.

SUMMARY OF THE INVENTION

To this end, the invention provides a motor vehicle headlamp of the type comprising a lamp, a reflector in which the lamp is mounted, and a glass suitable for being received in an opening in the bodywork of the vehicle, wherein the glass is fixed to the bodywork in the region of said bodywork adjacent to the opening.

The above-described accumulation of dimensional errors is thus avoided.

It may be observed at this point that accurate fixing of the glass on the bodywork is made possible, in particular, by the fact that modern glasses are manufactured by molding transparent plastic, and consequently they offer greater flexibility when it comes to making arrangements for fixing purposes.

BRIEF DESCRIPTION OF THE DRAWINGS

Embodiments of the invention are described by way of example with reference to the accompanying drawings, in which:

FIG. 1 is a diagrammatic horizontal section through a headlamp constituting a first embodiment of the invention;

FIG. 2 is a diagrammatic horizontal section through a headlamp constituting a second embodiment of the invention;

FIG. 3a is a section view on line IIIA—IIIA of FIG. 5, taken through the bodywork of the vehicle;

FIG. 3b is a section view on line IIIB—IIIB of FIG. 5, taken through the bodywork of the vehicle;

FIG. 4 is a section view on line IV—IV of FIG. 5;

FIG. 5 is a fragmentary rear view of a headlamp constituting a concrete embodiment of the invention;

FIG. 6 is a section view on line VI—VI of FIG. 5;

FIG. 7 is a section view on line VII—VII of FIG. 5;

FIG. 8 is a section view on line VIII—VIII of FIG. 5; and

FIG. 9 is a horizontal section view through a headlamp constituting another concrete embodiment of the invention.

DESCRIPTION OF PREFERRED EMBODIMENTS

With reference initially to FIG. 1, there can be seen a diagram of a headlamp which comprises a lamp 20, a reflector 30, and a front glass 40, preferably made of molded transparent plastic. The bodywork of the vehicle in the region of the headlamp is referenced 50. According to an aspect of the invention, the headlamp itself does not have a box, with the box being defined, for example, merely by an appropriate shape of an add-on component such as a transverse member provided in conventional manner in the front of the vehicle, so as to define a housing 10 for the headlamp.

It can be seen that the headlamp assembly constituted by the lamp, the reflector, and the glass is fixed on the bodywork 50 of the vehicle. More precisely, in this example, the glass 40 includes one or more lateral tongues 42b which are suitable for being engaged in essentially complementary cavities 54 formed in the bodywork 50. These cavities are defined by reentrant members 50b formed in the bodywork behind its main wall, in the region of a side edge of an opening formed through said bodywork to receive the glass. Close to the opposite lateral edge of said opening, the bodywork is formed on its rear face with one or more projections or studs 50a in which tapped holes are formed, for example.

On the same side, the glass includes one or more lateral tabs 42a having holes formed therein for receiving screws 52 suitable for being engaged in the above-mentioned tapped holes.

The reflector 30 is connected to the glass by link means, diagrammatically represented by means 34a, 34b which may be of conventional design, in particular being suitable for manual or motor-driven adjustment of the orientation of the reflector in elevation and/or in azimuth.

Flanges 44a, 44b on the glass and flanges 32a, 32b on the front edge of the reflector 30 are also shown diagrammatically, and the link means 34a, 34b may operate between said flanges.

Reference 31 designates a cap that is placed over the back of the hole in the reflector in order to protect the electrical connections of the lamp 20.

The portion of the transverse member of the vehicle that defines the headlamp housing is referenced 10. On its side face 10a furthest from the cavities 54 in the bodywork, it includes an opening that is closed by a removable cover 12.

The assembly constituted the lamp 20, the reflector 30, and the glass 40 may be inserted in the housing sideways through the above-mentioned opening. During such installation, the operator positions the assembly 20-30-40 in such a manner as to insert the tongue(s) 42b in the corresponding cavity(ies) 54, and then pivots the said assembly about a pivot axis defined by said tongues and in the direction of arrow F so as to press the tab(s) 42a against the stud(s) 50a, with the screw(s) 52 subsequently being installed and tightened in order to fix said assembly rigidly in place.

Naturally, fixing by means of the screws 52, and similarly retention by means of tongues and cavities, can be replaced by any other mechanically equivalent means, e.g. by snap-fastening. It is also possible to envisage using adhesive.

A new design of headlamp is thus implemented which is cheaper and which eliminates all of the problems relating to clearance or manufacturing tolerances in the bodywork and/or in a box that led in the prior art to the glass no longer being flush with the bodywork. As a corollary, it is possible to omit the box that is normally required for fixing the headlamp, in which case the body of the vehicle or an element applied thereto is designed to define a housing suitable for the headlamp, and then plays the role of said box.

FIG. 2 shows another basic embodiment of a headlamp of the invention. Elements or portions that are identical or similar to those of FIG. 1 are designated therein by the same references.

The portion 10 of the transverse member of the vehicle defining the housing for the headlamp includes an opening in its rear face 10b and a rigid cover 12 can be securely fixed on said housing to close said opening. In this second example, the lamp 20 and the reflector 30 constitute one subassembly while the glass 40 constitutes a second subassembly, which subassemblies are separate from each other. More precisely, only the glass 40 is installed in the opening in the bodywork and it is fixed to the bodywork in the same manner as described with reference to FIG. 1 (except that the glass is inserted from behind rather than from the side).

It can be seen that the reflector 30 which in turn holds the lamp 20 is installed on the cover 12, on the inside thereof. To this end, the reflector includes at least two legs 38a and 38b that extend rearwards and that are preferably integrally molded therewith. Assembly means, optionally including means for adjusting elevation and/or azimuth are represented diagrammatically at 39a, 39b and act between the rigid cover 12 and flanges 36a and 36b provided at the ends of the legs 38a, 38b.

Installing the cover 12 positions the reflector and the lamp.

Naturally, any appropriate sealing means such as sealants, gaskets, bellows, etc. are provided in the projectors of FIGS. 1 and 2 to ensure that the optical portions of the headlamp are protected from dust and from moisture. These sealing means may act between the member that defines the housing 10 and the bodywork 50, and/or between the reflector 30 and the glass 40.

A particular advantage of the embodiment shown in FIG. 2 lies in that the glass and the reflector/lamp subassembly can be replaced independently from each other in the event of damage. In particular, it is possible to replace the glass on its own in the event of it being broken and this is quite cheap compared with replacing an entire optical block as is generally required by the construction of prior headlamps.

With reference now to FIGS. 3a, 3b, and 4 to 8, a first concrete embodiment of a headlamp of the invention is described. This headlamp has the same general organization as that shown in FIG. 1, i.e. the glass is fixed to the bodywork with the reflector carrying the lamp being mounted in adjustable manner on the glass.

FIGS. 3a and 3b show the bodywork 150 in the region of the opening intended for the glass, said bodywork being provided on its inside face with four projecting rods 152a–152d which are centrally tapped from their free ends. Gusset plates 154 provide these rods with mechanical strength. Bolts 156 associated with washers 158 serve to fix the glass 140 on the bodywork.

In this respect, and as can clearly be seen in FIG. 5, the glass 140 has four lateral tabs 146 each provided with a hole for passing the associated bolt.

The reflector 130 is mounted on the glass by means of a conventional device having three pivots forming three bearing points disposed at the three vertices of a right-angled triangle, one of the bearing points being stationary and the other two being movable parallel to the optical axis x—x of the headlamp to enable its beam to be adjusted in elevation and in azimuth.

References 142a to 142c designate three tabs integrally formed with the glass 140, each tab including a through hole in which a respective intermediate element 144a to 144c is snap-fastened so as to define respective spherical sockets.

In complementary manner, the reflector 130 is fitted with three rods 135a to 135c whose free ends have respective ball-shaped heads 136a to 136c which are snapped into the spherical sockets, thereby defining the three above-mentioned bearing points.

As shown in FIG. 4, the rod 135a is controlled to move along its axis by an electric motor 134 which is fixed to a bracket 138a integrally molded with the reflector 130, thereby adjusting the elevation of the beam. This figure also shows that the rod 135b is defined by a threaded element 139 screwed into a complementary tapped hole formed in the lateral tab 138b integrally formed with the reflector. A drive head 137 integral with the threaded element 139 makes it possible to adjust the azimuth orientation of the beam manually by means of an appropriate tool.

FIG. 8 shows the stationary bearing point in which the corresponding ball head 136c is provided at the free end of a threaded rod 135c which is screwed into a complementary tapped hole formed in another tab 138c which is itself integrally formed with the reflector 130. The rod 135c cannot be adjusted from the outside once the parts are assembled together.

The headlamp is also fitted with an auxiliary lamp 122 for the dipped headlight function (FIG. 8).

Reference 110 designates the portion of the transverse front member of the vehicle which defines a housing for the headlamp. FIG. 7 shows that this member defines a cable passage 114 which may be closed by a cap (not shown) and which serves to pass the cables that power the lamps 120 and 122, and the elevation adjustment 134.

It will be observed that in the concrete embodiment described above, the space inside the headlamp can advantageously be sealed by providing a gasket, sealant, or the like at the junction between the transverse member and the bodywork, with sealing being further ensured by a cap (not shown) for covering the cable passage 114. In a variant, the member and the bodywork 150 may originally be fastened together, e.g. by welding, thereby constituting a single element of the vehicle body. In yet another possible configuration, the member defining the housing 10 or 110 and the bodywork 50 or 150 may be formed integrally.

A second concrete embodiment of the invention is shown in FIG. 9. Portions or elements that are the same as those of FIGS. 3a, 3b, and 4 to 8 are designated by the same references, with the hundreds digit increased by one, and are not described again.

As can be seen, the headlamp is sealed against dust and moisture by means of a peripheral annular bellows 260 that completely surrounds the headlamp. All along its opposite front and back edges, this bellows includes respective beads 262 and 264. A portion 242d of the glass 240 which is set back relative to its central light-passing portion includes an outwardly facing groove 243 around its entire periphery in which the front bead 262 is engaged by force. It should be observed that this setback portion 242d of the glass also serves to receive the intermediate elements 244a-244c that define the spherical sockets for the three bearing points between the reflector and the glass. This portion 242d thus performs the same function as the portions 142a-142c of the glass 140 in the preceding embodiment.

Similarly, the reflector 230 includes a flange 238d that extends around its entire periphery and that includes an outwardly facing groove 233 which receives the back bead 264 of the bellows.

The said flange 238d which may be circular or otherwise in outline also performs the functions of the portions 138a-138c of the reflector 130 in the preceding embodiment.

The bellows 260 makes it possible to accommodate relative movement between the reflector and the glass while adjusting the elevation and the azimuth of the direction of the emitted light beam, without compromising the sealing provided by the bellows.

Naturally the present invention it not limited in any way to the embodiments described above and shown in the drawings, and the person skilled in the art will be able to make variants or modifications thereto without going beyond its scope.

We claim:

1. A headlamp for a motor vehicle having a bodywork, said headlamp comprising a lamp, a reflector in which the lamp is mounted, and a glass suitable for being received in an opening in the bodywork of the vehicle, wherein the glass is fixed directly and solely to the bodywork in the region of said bodywork adjacent to the opening by first mounting means, and wherein second, adjustable, mounting means are provided for mounting the reflector directly and solely on the glass for the purpose of adjusting the orientation of a generated light beam.

2. A headlamp according to claim 1, wherein the glass is fixed to the bodywork of the vehicle by one or more means selected from the group comprising: screw means, snap-fastening means; mutual engagement means; and adhesive means.

3. A headlamp according to claim 1, further including a housing for the headlamp, said housing being defined by an add-on element secured to the vehicle bodywork.

4. A headlamp according to claim 3, wherein said add-one element of the vehicle is constituted by a front transverse element of the bodywork defining a recess.

5. A headlamp according to claim 3, wherein said housing includes an opening enabling the headlamp to be mounted therein.

6. A headlamp according to claim 1, further comprising sealing means between said reflector and said glass.

7. A headlamp according to claim 6, wherein said sealing means comprises at least one bellows.

8. A headlamp according to claim 1, wherein said second, adjustable mounting means comprise an outwardly extending bracket provided on said reflector, an electric corrector mounted on said bracket, a translatable rod driven by said electric corrector, said rod being mounted at a free end thereof on a lateral region of the glass.

9. A headlamp according to claim 1, wherein said second, adjustable mounting means comprises a lateral tab provided on said reflector and defining a threaded hole, a threaded rod engaged into said threaded hole, said rod being provided with manual driving means and being mounted at a free end thereof on a lateral region of the glass.

* * * * *